Patented June 20, 1933

1,914,824

UNITED STATES PATENT OFFICE

RUDOLF EBERHARD, OF MUNICH, GERMANY

PROCESS FOR THE PREPARATION OF HUMOUS COLLOIDS

No Drawing. Application filed May 6, 1929, Serial No. 360,999, and in Germany May 22, 1928.

Methods are known for the preparation of water-soluble humous colloids from humous materials by treatment with water-soluble substances of an inorganic character which exhibit either acid or strongly basic properties. Among the water-soluble substances having strongly basic properties, used in existing methods, are caustic alkalis and alkalis of carbonic and phosphoric acid. Methods are also known in which, in lieu of the said strongly inorganic bases, use is made of water soluble strongly basic compounds of organic origin, such as pyridine or its water soluble derivatives and compounds as well as corresponding compounds of chinolin. The nature or composition of the dissolved humous compounds is dependent on the character of said strongly basic compounds; for example, by heating humous material with strong bases the originally existing labile amido compounds are decomposed. The preservation of these is however of considerable importance for various purposes, medicinal in particular.

The use of pyridine and the like has the additional disadvantage that it cannot be completely removed from the solution of humous substances and in view of the objectionable odor of pyridine its presence, particularly in medicinal compounds, is extremely undesirable.

Of the water-soluble organic substances which can be used for the preparation of water-soluble humous colloids the so-called indifferent extracting agents cannot be seriously considered from a technical standpoint since, according to the figures in the literature, the yields obtained with them are negligible. Such water-soluble humous colloids of neutral as of weak alkaline reaction are however of greater importance for technical and medicinal purposes.

For technical purposes, these water soluble humous colloids are advantageously usable in photography for the production of certain kinds of plates and films; for agricultural purposes the neutral or weakly alkaline nature of such colloids is important in spraying plants for combating the destructive action of bugs, beetles and the like, while preventing burning or otherwise damaging plants as is so frequently done by strongly alkaline media. In therapy, the almost neutral reaction of the blood is not disturbed by the resorption of such neutral humous colloids and with respect to the fermentative processes of the glandular secretions, in the dissociation of the nuclei acids the said weakly alkaline humous colloids in connection with their reducing properties effect a retardation or prevention of oxidizing actions. The said colloids are also adapted for injections and for external therapeutic uses.

Their preparation is the purpose of the present process. Essentially it consists in allowing humous material of any kind and origin to react with water-soluble nitrogen-containing organic compounds derivable from ammonia of neutral or weakly alkaline reaction under pressure or not, at ordinary or raised temperature. By this means the disadvantages of the previously considered methods are avoided, i. e., decomposition or transformation of the volatile and labile constituents of the humous compounds, (nitrogen amido compounds for example) is eliminated, in contrast to the corresponding action of strongly alkaline substances of an inorganic or organic nature.

The product of my process may be used therapeutically for all inflammatory conditions in which resorptive effect is sought, for example in the case of inflammation of the joints, arthritic and rheumatic affections, parametritis, perimetritis, etc.

The difference between the chemical composition of the reaction products of the humous substances produced by the neutral or weakly alkaline method and that produced by the strongly basic method is also shown by the fact that the solutions produced by the present method, after complete condensation and hardening, yield crystals or crystalline powder which may be again completely dissolved in water, as distinguished from what may be done with the reaction products obtained by the strongly basic procedure. The dissolving capacity of these products is of very great importance in many cases.

With the present process the aqueous solutions of hexamethylenetetramine, urea, as indeed any water-soluble nitrogen-containing derivatives of ammonia, homologues and substitution products of carbonic acid, formanilide, formaldoxime, acetaldehyde ammonia and piperazine among others can be employed. These substances can be employed of course alone or in mixtures.

The amides of the monobasic fatty-acids, acetamide or formamide for example, which are particularly suited to the extraction of drugs, cannot be included among the water-soluble nitrogen-containing compounds of neutral reaction since they give no yield for all practical purposes with humous material even on heating to boiling for several hours.

As opposed to all previously know methods well-crystallized organic bodies can by the present process be obtained as products of reaction, e. g. by the action of urea, biuret etc. on peat or other humous matter. These crystalline products dissolve in water to give a colloidal solution. Exact determination of the humin compounds for the preparation of any particular combination is thus possible. Humic acids separated from solution also dissolve in the described organic compounds. Indeed in some cases the nitrogen-containing organic compounds can be made to act in the molten state on humous material.

According to the new process for example 2 parts by weight of finely powdered peat, 2 parts by weight of formanilide and 20 parts by weight of water are heated to 90° C. for an hour. The product is diluted with hot water, the deep brown solution obtained is separated from the residue and concentrated as desired.

Or: 4 parts by weight of urea, 4 parts by weight of finely powdered peat and 40 parts by weight of water are heated to 95° C. for 2 hours. The resulting deep brown solution is separated by pressing and after filtration can be made to yield crystals. Brown crystals are obtained which dissolve in water to a colloidal solution of neutral reaction and dark brown colour.

To obtain combined humous colloids the reaction products obtained by the previous method can be coupled with such organic and inorganic compounds, which are water-soluble or which dissolve in the aqueous solutions of the organic compounds mentioned as employed for the decomposition of humous material. Chemical substances which have reducing properties are especially suitable. Among others, e. g., can be employed water-soluble aldehydes and their water-soluble derivatives, hydroquinone, resorcinol, pyrogallol, yeast, size, tannin and silver nitrate, arsenic acid, mercuric chloride.

For example, 1 part by weight resorcinol is mixed with 2 parts by weight formanilide-humate. The substance which separates out will dissolve on addition of three parts by weight of water and warming to a grey-brown liquid of alkaline reaction which opalesces on dilution.

Or: 5 parts by weight of the described urea humate crystals are dissolved in 20 parts by weight of water and to this solution is added 1 part of silver nitrate. A clear brown liquid of neutral reaction is obtained. That the silver is here bound to the humate can be readily proved, e. g., silver mirror after precipitation with hydrochloric acid.

The humous colloids obtained by the newly-discovered process can also be combined with such organic or inorganic compounds as dissolve in the melts of the nitrogen-containing organic compounds employed for the preparation of the starting products or in their mixed melts. The following can be employed, e. g.; chlorophyll, aniline, iodine, hydrated silicic acid, calcium fluoride, aluminium hydroxide, mercury sulphide, etc.

For example: 5 parts by weight urea are heated until fused and in the melt 0,5 parts by weight chlorophyll and 0,3 parts by weight aluminium hydroxide are introduced. The melt is heated for a further time until gas is evolved and the thickish hot mass is dissolved in 20 parts by weight of the described formanilide humate.

A modification of the present process is the use of water-soluble nitrogen-containing organic compounds of neutral or weakly alkaline reaction which contain sulphur in addition to the above mentioned nitrogenous groups for obtaining sulphur-containing humous colloids. To this end can be used thiourea, ammonium thiocyanate etc.

For example: 10 parts by weight thiourea and 2 parts by weight sodium thiosulphate are dissolved in 50 parts by weight of water, mixed with 15 parts by weight of peat and heated to 90° C. for 2 hours. After separation by pressing and thickening a yellow-brown colloidal solution is obtained. The afore-mentioned inorganic sulphur compounds can be employed alone of course for the preparation of sulphur-containing humous colloids and the colloids so obtained mixed with the humous colloids obtained by decomposition by means of organic nitrogen- and sulphur-containing reagents.

The above mentioned combining bodies can be added either to the prepared humous colloids or to the starting substances or during the preparation.

If the sulphur-free humous colloids obtained by the present process, e. g., the neutral formanilide humate, are treated with acids, e. g. phosphoric acid, only a part of the humic acids separates slowly while the remaining part remains dissolved with a ruby-red colour. These humins in acid solution can likewise be coupled with the aforementioned combining bodies.

I claim:

1. The herein described process of producing humous colloids of neutral character, which consists in reacting peat with water soluble organic compounds of neutral reaction containing nitrogen groups derivable from ammonia.

2. The herein described process of producing humous colloids of neutral character, which consists in reacting peat with water soluble organic compounds of neutral reaction containing nitrogen groups derivable from ammonia, said reaction being effected in the presence of iodine.

3. The herein described process of producing humous colloids of neutral character, which consists in reacting peat with water soluble organic sulphur-containing compounds of neutral reaction containing nitrogen groups derivable from ammonia.

4. The herein described process of producing humous colloids of neutral character, comprising the step of claim 2 and the additional step of effecting crystallization of the reaction products.

5. The herein described process of producing humous colloids of neutral character, comprising the step of claim 2 and the additional step of adding acid to the reaction product to obtain a final product in acid solution.

In testimony whereof I hereunto affix my signature.

RUDOLF EBERHARD.